(12) United States Patent
Kim et al.

(10) Patent No.: US 10,187,135 B2
(45) Date of Patent: Jan. 22, 2019

(54) METHOD AND APPARATUS FOR GENERATING CSI REPORT

(71) Applicant: Electronics and Telecommunications Research Institute, Daejeon (KR)

(72) Inventors: Cheulsoon Kim, Daejeon (KR); Wooram Shin, Daejeon (KR); Sung-Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 175 days.

(21) Appl. No.: 14/935,321

(22) Filed: Nov. 6, 2015

(65) Prior Publication Data

US 2016/0134408 A1 May 12, 2016

(30) Foreign Application Priority Data

| Nov. 7, 2014 | (KR) | 10-2014-0154475 |
| Apr. 10, 2015 | (KR) | 10-2015-0051179 |
| Jul. 8, 2015 | (KR) | 10-2015-0097116 |
| Jul. 10, 2015 | (KR) | 10-2015-0098604 |
| Oct. 30, 2015 | (KR) | 10-2015-0152613 |

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01); *H04B 7/063* (2013.01); *H04B 7/0632* (2013.01); *H04B 7/0639* (2013.01)

(58) Field of Classification Search
CPC .................................................. H04B 7/0626
See application file for complete search history.

(56) References Cited

U.S. PATENT DOCUMENTS

| 2011/0170435 A1 | 7/2011 | Kim et al. |
| 2012/0020272 A1 | 1/2012 | Lee et al. |
| 2013/0010707 A1* | 1/2013 | Gaal ...................... H04L 5/003 370/329 |
| 2013/0194931 A1* | 8/2013 | Lee ....................... H04L 5/0053 370/241 |
| 2014/0126668 A1 | 5/2014 | Kim et al. |
| 2014/0241323 A1 | 8/2014 | Park et al. |
| 2015/0124758 A1 | 5/2015 | Kim et al. |
| 2015/0200757 A1 | 7/2015 | Wu et al. |

FOREIGN PATENT DOCUMENTS

| CN | 103858501 A | 6/2014 |
| KR | 10-2011-0083445 A | 7/2011 |

* cited by examiner

*Primary Examiner* — Samina F Choudhry
(74) *Attorney, Agent, or Firm* — William Park & Associates Ltd.

(57) ABSTRACT

Provided are a method for generating a CSI report and a terminal thereof. The method for generating a CSI report includes: receiving a CSI-RS from a serving cell of a base station through at least one CSI-RS resource included in a CSI-RS occasion; and generating the CSI report based on the CSI-RS received through the at least one CSI-RS resource.

15 Claims, 14 Drawing Sheets

```
csi-SubframePatternConfig-r10    CHOICE {
    release             NULL,
    setup               SEQUENCE {
        csi-MeasSubframeSet1-r10    MeasSubframePattern-r10,
        csi-MeasSubframeSet2-r10    MeasSubframePattern-r10,    OPTIONAL -- Need ON
    }
}
```

FIG. 12A  FIG. 12B
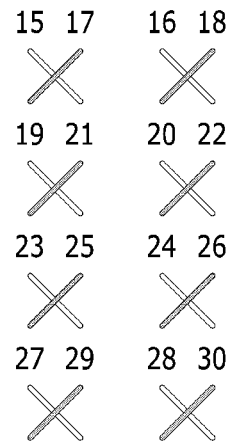
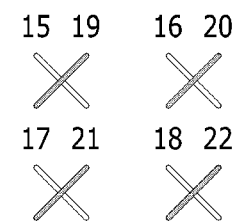
FIG. 12C  FIG. 12D
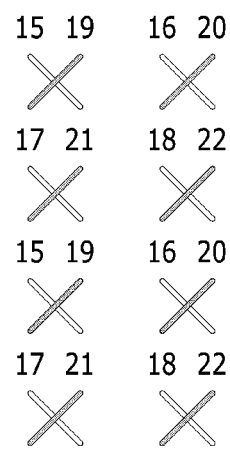
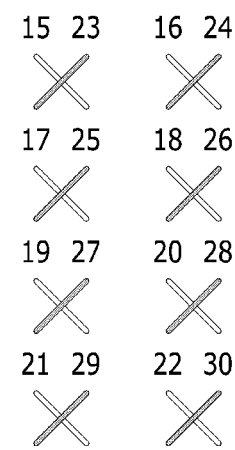

METHOD AND APPARATUS FOR GENERATING CSI REPORT

CROSS-REFERENCE TO RELATED APPLICATION

This application claims priority to and the benefit of Korean Patent Application Nos. 10-2014-0154475, 10-2015-0051179, 10-2015-0097116, 10-2015-0098604, and 10-2015-0152613 filed in the Korean Intellectual Property Office on Nov. 7, 2014, Apr. 10, 2015, Jul. 8, 2015, Jul. 10, 2015, and Oct. 30, 2015, the entire contents of which are incorporated herein by reference.

BACKGROUND OF THE INVENTION (a) Field of the Invention

The present invention relates to a method and an apparatus for generating a channel state information (CSI) report on a base station in a wireless communication system.

(b) Description of the Related Art

In Rel-12 of $3^{rd}$ Generation Partnership Project (3GPP) Long Term Evolution (LTE), 8 channel state information-reference signal (CSI-RS) ports are defined. A serving cell of a base station may allocate the CSI-RSs to each antenna port and may receive CSI reports for the CSI-RS ports from a user equipment (UE). In this case, solutions for using more antenna ports (for example, 16, 32, or 64 pieces) in the serving cell are required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for generating a channel state information (CSI) report on more antenna ports. The present invention has also been made in an effort to provide an apparatus for generating a channel state information (CSI) report on more antenna ports.

An exemplary embodiment provides a method for generating a CSI report. The method for generating a CSI report includes: receiving a CSI-RS from a serving cell of a base station through at least one CSI-RS resource included in a channel state information-reference signal (CSI-RS) occasion; and generating the CSI report based on the CSI-RS received through the at least one CSI-RS resource.

The CSI-RS occasion may include at least one subframe.

The method may further include: prior to the receiving, receiving information on the CSI-RS occasion from the base station.

The receiving of the information on the CSI-RS occasion from the base station may include receiving information on the CSI-RS occasion from the base station through a radio resource control (RRC) signaling.

The information on the CSI-RS occasion may include at least one of period information of the CSI-RS occasion, subframe offset information of the CSI-RS occasion, and identification list information of the CSI-RS resource.

Identification list information of the CSI-RS resources may include at least one of information on the number of antenna ports for each CSI-RS resource included in the at least one CSI-RS resource, information on CSI-RS resource configuration, information on a relative subframe offset, and association information.

The generating may include generating a plurality of CSI reports for the CSI-RS occasion.

The generating may include generating the CSI reports for every the at least one CSI-RS resource.

The generating may include generating the CSI report based on association information of the CSI-RS resources defined for the CSI-RS occasion.

The generating may include generating the CSI reports for each subframe set consisting of some subframes of the at least one subframe.

Another embodiment provides a terminal including: at least one processor; a memory; and a radio frequency unit, in which the at least one processor may execute at least one program stored in the memory to perform receiving a CSI-RS from a serving cell of a base station through at least one CSI-RS resource included in a channel state information-reference signal (CSI-RS) occasion; and generating the CSI report based on the CSI-RS received through the at least one CSI-RS resource.

The CSI-RS occasion may include at least one subframe.

The at least one processor may further execute receiving information on the CSI-RS occasion from the base station, prior to the receiving of the CSI-RS by executing the at least one program.

The at least one processor may execute the receiving of the information on the CSI-RS occasion from the base station through radio resource control (RRC) signaling when executing the receiving of the information on the CSI-RS occasion from the base station by executing the at least one program.

The information on the CSI-RS occasion may include at least one of period information of the CSI-RS occasion, subframe offset information of the CSI-RS occasion, and identification list information of the CSI-RS resource.

Identification list information of the CSI-RS resources may include at least one of information on the number of antenna ports for each CSI-RS resource included in the at least one CSI-RS resource, information on CSI-RS resource configuration, information on a relative subframe offset, and association information.

When executing the generating of the CSI report by executing the at least one program, the at least one processor may execute the generating of the plurality of CSI reports for the CSI-RS occasion.

When executing the generating of the CSI report by executing the at least one program, the at least one processor may execute the generating of the CSI reports for every the at least one CSI-RS resource.

When executing the generating of the CSI report by executing the at least one program, the at least one processor may execute the generating of the CSI report based on association information of the CSI-RS resources defined for the CSI-RS occasion.

When executing the generating of the CSI report by executing the at least one program, the at least one processor may execute the generating of the CSI reports for each subframe set consisting of some subframes of the at least one subframe.

According to an exemplary embodiment of the present invention, it is possible to generate the CSI report for more antenna ports using the CSI-RS occasion including at least one subframe.

BRIEF DESCRIPTION OF THE DRAWINGS

FIG. 1 is a diagram illustrating a CSI-RS resource index.

FIG. 4 is a diagram illustrating a csi-SubframePattern-Config-r10 parameter according to an exemplary embodiment of the present invention.

FIGS. 12A to 12D are diagrams illustrating CSI-RS port numbering of a serving cell according to another exemplary embodiment of the present invention.

FIGS. 13A to 13D are diagrams illustrating CSI-RS port numbering of a serving cell according to another exemplary embodiment of the present invention.

DETAILED DESCRIPTION OF THE EMBODIMENTS

Figure 2:
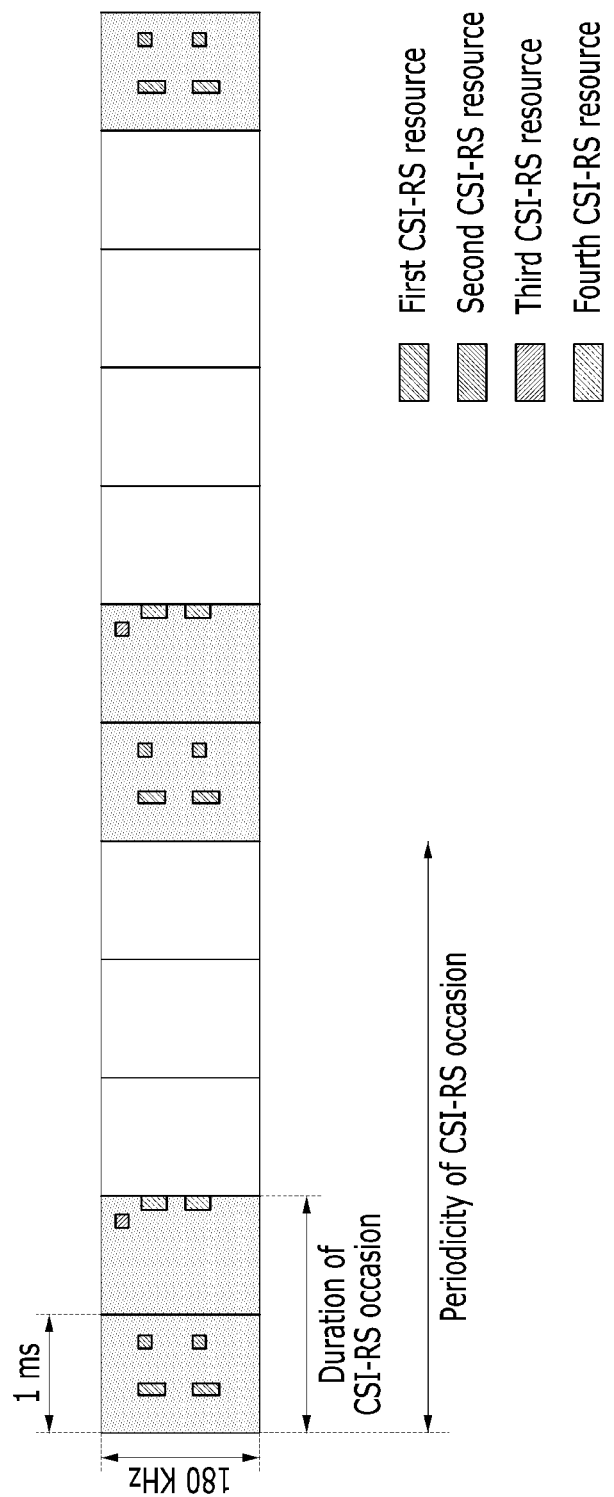
FIG. 2 is a diagram illustrating a CSI-RS occasion according to an exemplary embodiment of the present invention.

Hereinafter, exemplary embodiments will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine type communication device (MTC device), and the like and may also include all or some of the functions of the MS, the MT, the AMS, the HR-MS, the SS, the PSS, the AT, the UE, the MTC device, and the like Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Figure 1:
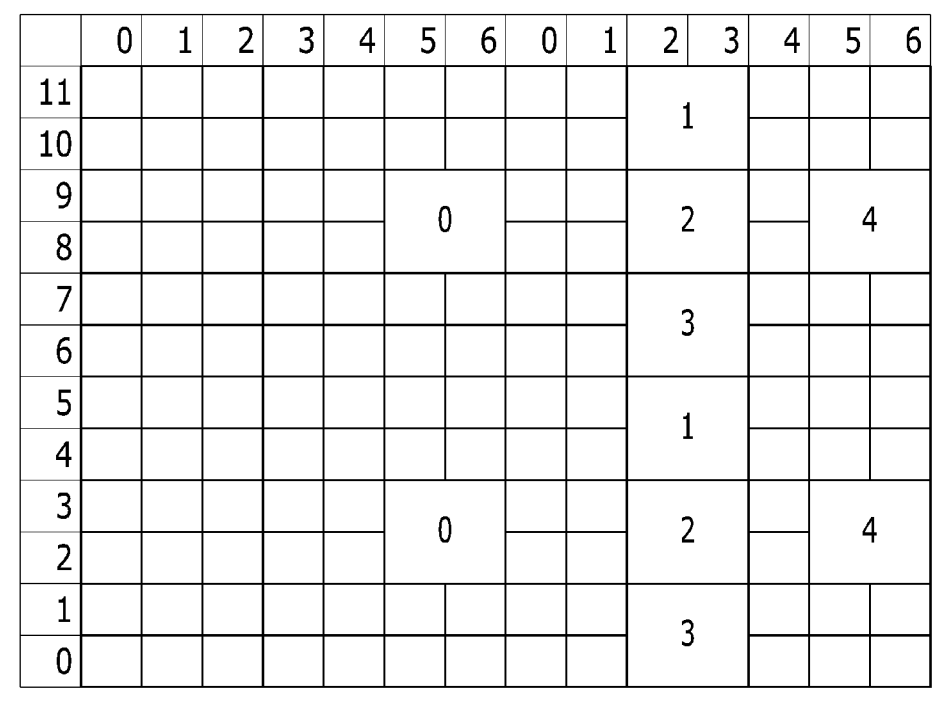

FIG. 1 is a diagram illustrating a CSI-RS resource index.

Referring to FIG. 1, 5 or less CSI-RS resources may be configured for 8 antenna ports in one subframe. Theoretically, 40 resource elements (REs) may be allocated as the CSI-RS resources in one physical resource block (PRB) pair, such that the UE may generate CSI reports for 40 transmission points. If the serving cell configures 16 or 32 antenna ports for the UE, those antenna ports for the serving cell may be transmitted within the one PRB pair. However, there is a need to provide a method for supporting antenna ports for the case in which the serving cell has 40 or more antenna ports and the UE performs channel estimation on all of the antenna ports.

To solve the above problem, two methods may be used. First, a new CSI-RS resource pattern capable of multiplexing more CSI-RS ports in one subframe may be defined (method 1). Further, the serving cell (hereinafter, referred to as a 'serving cell') of a base station may transmit the CSI-RS over several subframes and the UE may receive the CSI-RS in a plurality of subframes (method 2).

The method 1 has an advantage in that the CSI report may be generated using only one CSI-RS subframe. However, when the number of transmission ports are 64 (64-Tx), the number of orthogonal frequency division multiplexing (OFDM) symbols which may be allocated to a control region is limited to two, and therefore physical downlink control channel (PDCCH) capacity may be limited. Further, in the case of the 64-Tx, since the CSI-RS received from the serving cell is allocated to an RE of the CSI-RS subframe, the UE may not receive the CSI-RS of adjacent cells in the same subframe. In this case, the UE estimates CSI (precoding matrix Indicator (PMI)/rank indicator (RI)/channel quality indicator (Cal), etc.) of the serving cell and the CSI of the adjacent cells in different interference conditions, such that accuracy of two estimated CSIs may be different. As such, there is a problem in terms of the reduced CSI-RS multiplexing capacity in a co-channel heterogeneous network (HetNet).

In the exemplary embodiment of the present invention, the method for transmitting a CSI-RS in a plurality of subframes is considered. According to the exemplary embodiment of the present disclosure, the problem of the different interference conditions for each subframe upon transmitting the CSI-RS over several subframes may be solved.

First, the CSI-RS may be transmitted through a plurality of CSI-RS resources. In this case, the CSI-RS resource is called a set of REs configured for the UE by one CSI-RS resource configuration.

Meanwhile, a small cell discovery signal (for example, discovery reference signal (DRS)) may be transmitted in an occasion form. Further, a cell cluster-specific DRS occasion is defined and a discovery signal measurement timing configuration (DMTC) is configured in the UE to enable the UE to perform a radio resource management (RRM) measurement. A maximum of one CSI-RS resource may be transmitted to each cell in the subframe included in one DMTC.

According to the exemplary embodiment of the present invention, the CSI-RS occasion may be defined by the method for transmitting a plurality of CSI-RS resources in one cell, that is, a CSI-RS resource association method. The CSI-RS occasion may be composed of at least one downlink subframes including at least one CSI-RS resource. The CSI-RS occasion may include the CSI-RS resource(s) of the serving cell and the CSI-RS resource(s) of the adjacent cells. Hereinafter, the CSI-RS occasion will be described in detail with reference to FIG. 2.

FIG. 2 is a diagram illustrating the CSI-RS occasion according to the exemplary embodiment of the present invention.

Referring to FIG. 2, the CSI-RS occasions according to the exemplary embodiment each include four CSI-RS resources and includes two subframes adjacent to each other. A duration of the CSI-RS occasion is 2 ms and one CSI-RS resource is represented by the same duration. A periodicity of the CSI-RS occasion is 5 ms, and therefore the CSI-RS resources included in the CSI-RS occasion may also be transmitted at a periodicity of 5 ms. The two subframes included in the CSI-RS occasion are contiguous in FIG. 2, but the CSI-RS occasion according to another exemplary embodiment includes n discrete subframes.

Configuration information on the CSI-RS occasion may be indicated to the UE through a radio resource control (RRC) signaling. The RRC signaling including the configuration information on the one CSI-RS occasion may include at least one of periodicity information of the CSI-RS occasion, subframe offset information of the CSI-RS occasion, and identification (ID) list information of the CSI-RS resource. In this case, the ID list information of the CSI-RS resources may include at least one of information on the number of CSI-RS antenna ports for each CSI-RS resource ID, information on the CSI-RS resource configuration for each CSI-RS resource ID, information on relative subframe offsets for each CSI-RS resource ID with respect to the pre-determined reference subframe of the CSI-RS occasion, and association information on each CSI-RS resource ID. The relative subframe offset information of each CSI-RS resource ID and the association information on each CSI-RS resource ID may have a default value that is fixed in the specification, may be present only if configured values are different to the default value.

The CSI-RS periodicity information may include 5, 10, 20, 40, and 80 ms that are CSI-RS periodicity values. For the number of CSI-RS antenna ports and the CSI-RS resource configuration for each CSI-RS resource ID, signaling of the existing Rel-12 LTE standard may be reused. As a reference subframe for defining the relative subframe offsets for each CSI-RS resource ID, for example, a forefront subframe of the subframes configuring the CSI-RS occasion may be determined. In this case, the relative subframe offsets of different CSI-RS resource IDs may have the same value, such that a plurality of CSI-RS resources may be allocated to one subframe. Referring to FIG. 2, the periodicity of the CSI-RS occasion is 5 ms, the duration of the CSI-RS occasion is 2 ms, and a CSI-RS resource ID list is {0, 1, 2, 3}.

The association information on each CSI-RS resource ID is required when the serving cell receives the plurality of CSI reports from the UE. For example, when the serving cell having a 2-dimension uniform rectangular array (2D URA) configures two sets of CSI-RS ports for the UE, the UE may transmit a joint CSI report for all of the configured CSI-RS ports to the serving cell or either one of a horizontal CSI report or a vertical CSI report based on the corresponding set of CSI-RS port to the serving cell. Furthermore, when a CSI-RS occasion includes at least two CSI subframe set, the serving cell may request the separate CSI report for each CSI subframe set to the UE. In this case, the serving cell requests the two CSI reports to the UE, in one CSI-RS resource ID list. For this purpose, the CSI-RS resources corresponding to the plurality of CSI reports may be designated by additionally transmitting the association information to the UE through the RRC signaling. If one CSI report is pre-determined to generate in one CSI-RS resource ID list, even if the association information is not transmitted, the UE may use all of the CSI-RS resources included in the CSI-RS resource ID list to generate one CSI report.

Figure 3:
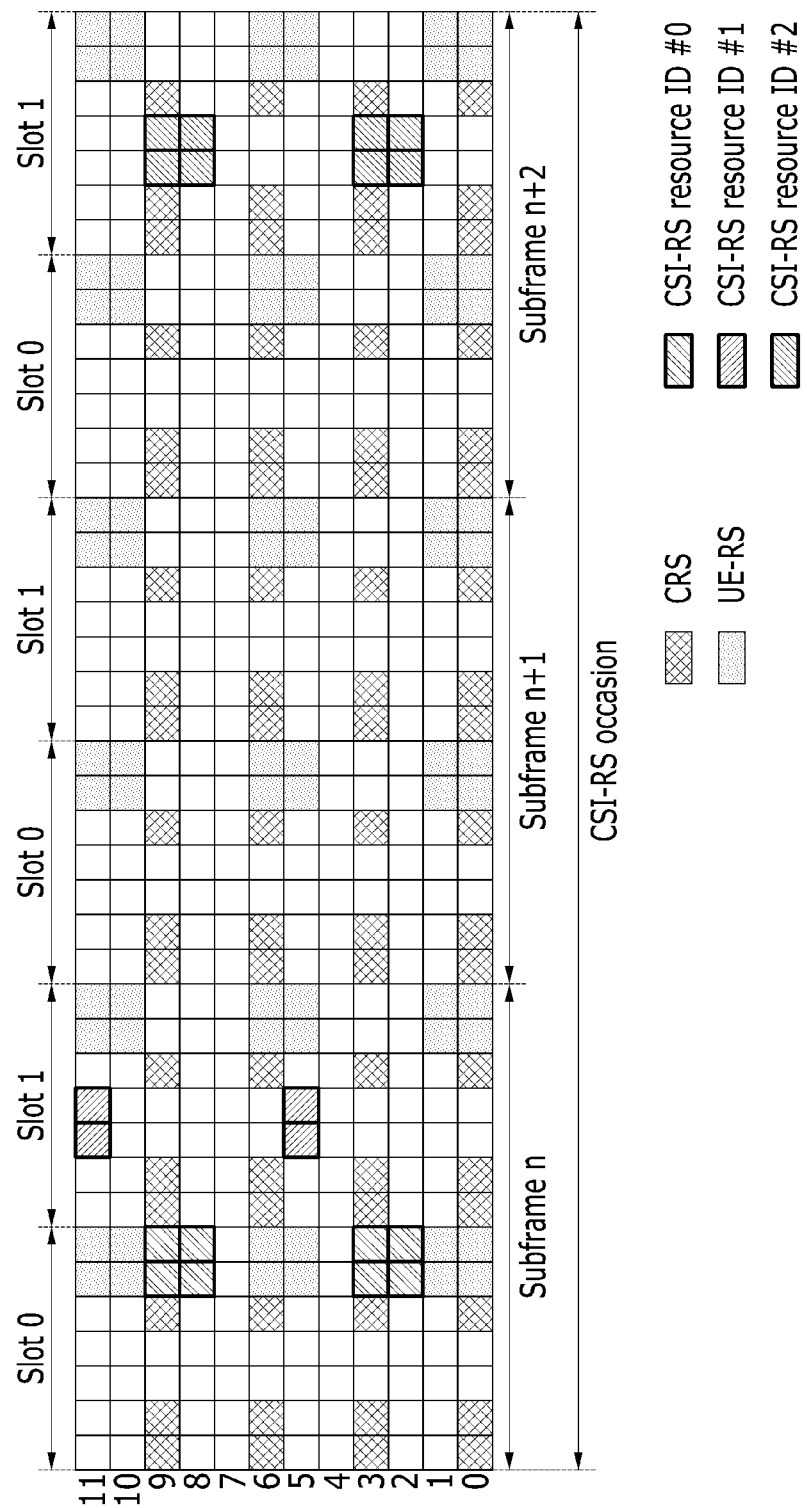
FIG. 3 is a diagram illustrating a CSI-RS occasion according to another exemplary embodiment of the present invention.

Meanwhile, some parameters included in the RRC signaling may be omitted by not being indicated to the UE in order to reduce the overhead of the RRC signaling. For example, when the serving cell configures a CSI report to the UE, some RRC parameters may be omitted. In this case, a default value of the omitted parameters may be predetermined. For example, when the serving cell does not configure a parameter of the duration of the CSI-RS occasion (CSI-RS occasion duration) separately, the CSI-RS occasion duration may be assumed '1' by the UE (that is, the default value of the CSI-RS occasion parameter is 1). When the CSI-RS occasion duration is 1, a default value of the relative subframe offset information may be assumed '0', and the serving cell may perform the RRC signaling to the UE when the relative subframe offset parameter is not '0'. Further, association information of the CSI-RS resource association that can be signaled to the UE may be assumed a value included in the CSI-RS resource ID list as a default configuration value. When the association information is assumed a value included in the CSI-RS resource ID list, the serving cell may perform the RRC signaling to the UE when the parameter of the association information is not the value of the CSI-RS resource ID list. FIG. 3 is a diagram illustrating a CSI-RS occasion according to another exemplary embodiment of the present invention.

Referring to FIG. 3, the CSI-RS occasion include three subframes and three CSI-RS resources. In this case, the ID list information of the CSI-RS resources included in the RRC signaling may be configured as follows.

CSI-RS resource ID list: {0, 1, 2}
CSI-RS Resource ID #0:
The number of CSI-RS antenna ports: 8
CSI-RS resource configuration: 0
Relative subframe offset: 0 (omissible)
CSI-RS Resource ID #1:
The number of CSI-RS antenna ports: 4
CSI-RS resource configuration: 1
Relative subframe offset: 0 (omissible)
CSI-RS Resource ID #2:
The number of CSI-RS antenna ports: 8
CSI-RS resource configuration: 2
Relative subframe offset: 2

In this case, the relative subframe offset of the CSI-RS resource ID #0 and CSI-RS resource ID #1 may be omitted because the value of the parameter is '0'. However, the serving cell transmits the relative subframe offset parameter to the UE through RRC signaling because the value of the parameter is '2'.

In the case of the UE in which the CSI-RS occasion may not be configured for the UE, the UE may demodulate one of the CSI-RS resources transmitted within the CSI-RS occasion that is transmitted for other terminals. The serving cell may reuse existing CSI-RS configuration to the UE.

Hereinafter, an implicit CSI-RS resource aggregation method will be described.

The implicit CSI-RS resource aggregation method defines the two CSI-RS resources in one subframe. When 16 or 12 CSI-RS ports are configured in the UE, the UE may use two CSI-RS resources to estimate the CSI. The serving cell indicates a first CSI-RS resource index to the UE, in which the first CSI-RS resource index has an 8-port or a 4-port. When the number of ports included in the first CSI-RS resource is insufficient, the UE may find out the rest of CSI-RS ports from a second CSI-RS resource. The UE may derive the second CSI-RS resource index from the first CSI-RS resource index. Further, the serving cell does not indicate the second CSI-RS resource index to the UE.

When the first CSI-RS resource is the 8-port, the UE may analyze and derive the index depending on 8-port CSI-RS port allocation; and when the first CSI-RS resource is the 4-port, the UE may analyze and derive the index depending on 4-port CSI-RS port allocation. When the second CSI-RS resource is the 8-port, the UE may analyze and derive the index depending on the 8-port CSI-RS port allocation; and when the second CSI-RS resource is the 4-port, the UE may analyze and derive the index depending on the 4-port CSI-RS port allocation.

In the implicit CSI-RS resource aggregation method, the first CSI-RS resource and the second CSI-RS resource may be configured to be located in the same OFDM symbol so that the UE can measure a channel at the same OFDM symbols. Therefore, when more than 8-port CSI-RS is configured in the UE, the OFDM symbol index may be limited to Nos. 2 and 3 of a first slot in a frequency division duplexing (FDD) system and may be limited to Nos. 2 and 3 and Nos. 1 and 3 of the first slot in a time division duplexing (TDD) system. If two different CSI-RS resources configured at different OFDM symbols are used to estimate the channel of the UE, interference conditions can vary for each OFDM symbol index and therefore the channel (that is, CSI) may be different and demodulation performance may be different depending on an implementation problem such as a carrier phase drift.

When 12 ports or 16 ports are configured in the UE and the first CSI-RS resource index is configured, the number of ports included in the first CSI-RS resource may be predefined in the standard or may be assumed to be the 8-port (port hypothesis method 1) or the 4-port (port hypothesis method 2) depending on the configuration of the serving cell. For example, when the 16 ports are configured in the UE and the port hypothesis method 1 is applied, one of 1, 2, and 3 may be configured as the first CSI-RS resource index to the UE. The second CSI-RS resource has the rest of eight ports and has different indexes from the first CSI-RS resource index. A resource index pair that may be assumed by the UE is as the following Equation 1.

(Equation 1)
Port Hypothesis Method 1-1:

(first CSI-RS resource index, second CSI-RS resource index)=(1,2) or (2,3) or (3,1)

Port Hypothesis Method 1-2:

(first CSI-RS resource index, second CSI-RS resource index)=(1,3) or (2,1) or (3,2)

For example, when the 12 ports are configured in the UE and the port hypothesis method 2 is applied, one value of 1, 2, 3, 6, 7, and 8 may be configured as the first CSI-RS resource index to the UE. The second CSI-RS resource has the rest of 8 ports. The resource index pair that may be assumed by the UE is as the following Equation 2.

(Equation 2)
Port Hypothesis Method 2-1:

(first CSI-RS resource index, second CSI-RS resource index)=(1,2) or (2,3) or (3,1)

Port hypothesis method 2-2:

(first CSI-RS resource index, second CSI-RS resource index)=(1,3) or (2,1) or (3,2)

In the case of the port hypotheses 1-1 and 1-2, the UE searches for the CSI-RS resources having lower adjacent subcarrier indexes in a resource block (RB). In the case of the port hypotheses 1-2 and 2-2, the UE searches for the CSI-RS resources having higher adjacent subcarrier indexes in the RB.

Hereinafter, a method for generating, by the UE, a CSI report for a CSI-occasion configured by the serving cell will be described.

The UE may generate one CSI report or a plurality of CSI report for one CSI-RS occasion.

First, a method for generating, by the UE, one CSI report for one CSI-RS occasion will be described (CSI report generation method 1). For example, when a 2-dimension active antenna system (2D AAS) is used in the serving cell, the UE may generate one joint CSI report from the plurality of CSI-RS resources by the CSI-RS resource association. The generated joint CSI report may synthetically reflect a horizontal CSI and a vertical CSI.

Next, a method for generating, by the UE, a plurality of CSI reports for one CSI-RS occasion will be described (CSI report generation method 2). When only the UE (for example, terminal of Rel-13 LTE system) in which the CSI-RS occasion may be configured is present in the serving cell, the joint CSI report may be used when a physical downlink shared channel (PDSCH) is transmitted to the UE in a Rel-13 transmission mode (TM). In this case, the serving cell transmits the association information to the UE through RRC signaling. If the serving cell configures the Rel-12 TM in the Rel-13 terminal, the serving cell configures only the horizontal CSI-RS port in the UE and thus may receive the CSI report. However, when the Rel-13 terminal and the Rel-12 terminal are present in the serving cell, the serving cell may consider multi-user pairing (MU pairing) of the Rel-13 terminal and the Rel-13 terminal to increase throughput. For this purpose, the Rel-13 terminal may generate a Rel-12 CSI report separately from or along with a Rel-13 CSI report and transmit the generated Rel-12 CSI report to the serving cell.

Further, the serving cell may perform the signaling on the Rel-13 terminal so that the Rel-13 terminal may generate the plurality of CSI reports for one CSI-RS resource association. Next, the Rel-13 terminal may generate the Rel-13 CSI report generated using all of the CSI-RS ports and the Rel-12 CSI report (that is, horizontal CSI report) generated by using some CSI-RS ports.

As the CSI report generation method 2, there may be the following two methods. When the plurality of CSI reports are generated for one CSI-RS occasion, the CSI report may be generated for one CSI-RS occasion for every CSI-RS resource (CSI report generation method 2-1) and the CSI-RS resource association for one CSI-RS occasion is defined and the CSI report may be in a CSI-RS resource subset unit (CSI report generation method 2-2). In this case, for the same CSI-RS resource transmission, the serving cell may additionally perform the RRC signaling on the association information of the CSI-RS resource association to the UE.

In the case of the CSI report generation method 1 and 2-2, the UE may generate the CSI reports for every associated CSI-RS resource. The CSI-RS resources associated in the CSI report generation method 1 are a collection of all the CSI-RS resources configured in the CSI-RS occasion. Further, in the CSI report generation method 2-2, each associated CSI-RS resource is a collection of the CSI-RS resources. In this case, since noise and interference may be different for every CSI-RS resource configuring the respective associated CSI-RS resources, the UE may generate the CSI (precoding matrix indicator (PMI)/rank indicator (RI)/ channel quality indicator (CQI)) report in consideration of all of the CSI-RS resources belonging to the associated CSI-RS resources. Further, the UE may consider the same assumption of the CSI reference resource (for example, cell specific reference signal (CRS) overhead, demodulation reference signal (DMRS) overhead, PDSCH TM, and reference signal energy per resource element (RS EPRE)) (that is, CSI reference resource assumption is the same in the associated CSI-RS resources.

A set of the respective parameters indicated by a PDSCH RE mapping and quasi-co-located indication (PQI) field of a downlink control information (DCI) format 2D may include a maximum of one non-zero-power (NZP) CSI-RS ID ('qcl-CSI-RS-ConfigNZPId-r11') to determine quasi co-location (QCL) of the PDSCH antenna port. One NZP CSI-RS ID corresponds to one CSI-RS resource. The RRC parameter 'CSI-RS-ConfigNZP-r11' for the CSI-RS resource configuration may include configuration information of CRS having a QCL relationship with the corresponding CSI-RS resource, besides the CSI-RS resource configuration information. When a CSI subframe set is configured in the UE, the UE may assume the CSI reference resource by differentiating the CSI-RS occasions belonging to the respective CSI subframe sets.

Hereinafter, the CSI subframe set will be described in detail.

In the co-channel HetNet scenario or the co-channel small cell scenario, to reduce an inter-cell interference effect, time domain interference coordination (for example, enhanced inter-cell interference coordination, (eICIC)) may be performed. When the eICIC is performed in the configured serving cell as a primary cell (PCell) for the UE, the serving cell may introduce an almost blank subframe (ABS) to perform different CSI reports and RPM measurements in the ABS and a non-ABS. The serving cell may indicate the ABS pattern to the UE through the RRC signaling. In this case, the ABS pattern may be a bit map of 40 lengths in the case of the FDD and may be bitmaps of 20/40/70 lengths depending on the subframe configuration in the case of the TDD. The UE may generate the CSI report by dividing the CSI subframe set into two.

If the CSI subframe set is configured in the serving cell, a coexisting method of the CSI-RS occasion and the CSI subframe set according to the exemplary embodiment may include a method (coexistence method 1) for allowing the CSI-RS occasion to be a subset of the CSI subframe set and a method (coexistence method 2) for allowing the CSI-RS occasion and the CSI subframe set to partially overlap with each other. The case in which the CSI-RS occasion includes the CSI subframe set is equivalent to the coexistence method 2

First, in the coexistence method 1, the CSI-RS occasion may be the same as the CSI subframe set.

In this case, the two CSI subframe sets may each include the CSI-RS occasion. When the CSI process is not configured in the UE, the UE generates the CSI report of the serving cell one by one for every CSI subframe. Therefore, when the serving cell configures the CSI subframe set in the UE, the serving cell transmits the two CSI-RS occasion configurations to the UE through the RRC signaling. In this case, the CSI-RS occasion information for each CSI-RS subframe set may be included in 'csi-SubframePatternConfig-r10', that is an LTE parameter, as information element (IE). FIG. 4 is a diagram illustrating the csi-SubframePatternConfig-r10 parameter according to an exemplary embodiment of the present invention.

Figure 5:
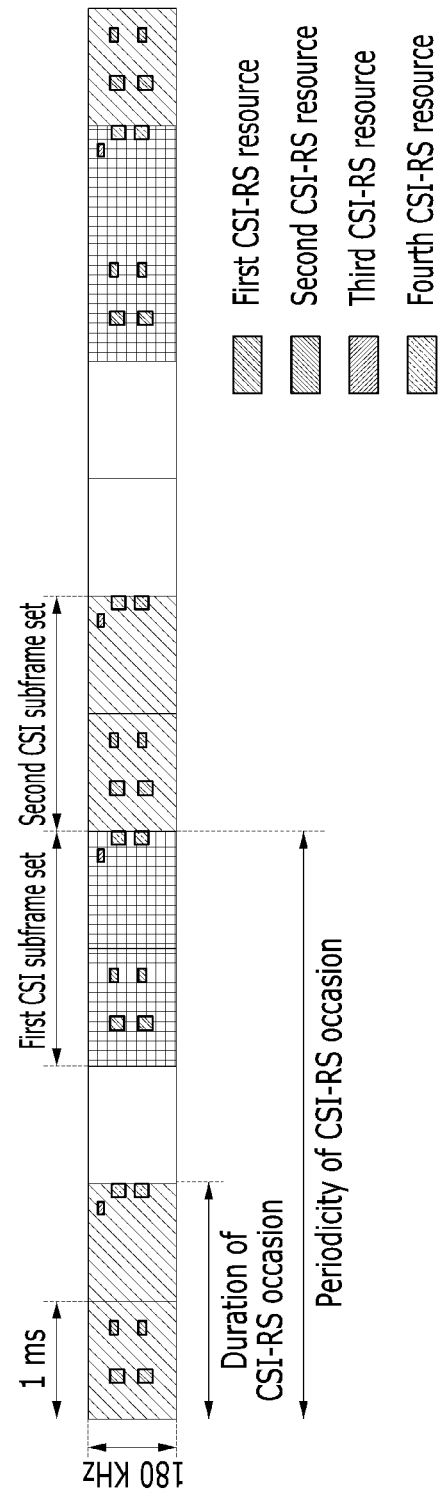
FIG. 5 is a diagram illustrating a CSI-RS occasion configured to be identical with a subframe set according to an exemplary embodiment of the present invention.

FIG. 5 is a diagram illustrating the CSI-RS occasion configured to be identical with the subframe set according to an exemplary embodiment of the present invention.

The subframe set according to the exemplary embodiment may include the CSI-RS occasion and the UE may generate one CSI report in the CSI-RS resources associated with the CSI-RS occasion. Referring to FIG. 5, a first CSI subframe set is represented by a lattice pattern and a second CSI subframe set is represented by an oblique pattern.

The serving cell may consider the periodicity of the CSI-RS occasion and the subframe offset for a bitmap design so that the CSI-RS subframe belonging to the CSI-RS occasion may be included in the same CSI subframe set.

For example, when in the FDD serving cell, the periodicity of the CSI-RS occasion is 80 ms or 160 ms, a CSI subframe set pattern may be determined to be 40 ms. In this case, the serving cell may configure the bitmap so that the CSI subframe set includes the CSI-RS occasion. It is assumed that the UE receives the CSI-RS in the subframe included in an intersection of the CSI-RS occasion and the CSI subframe set.

Alternatively, when in the FDD serving cell, the periodicity of the CSI-RS occasion is 5 ms, 10 ms, or 20 ms, the CSI subframe pattern may be determined to be 40 ms. In this case, the serving cell may repeatedly apply the CSI-RS occasion to induce the CSI-RS subframe pattern corresponding to 40 ms and configure the bitmap.

Next, in the coexistence method 2, the UE may generate the CSI reports for each CSI subframe set within the CSI-RS occasion.

If the subframe included in the CSI-RS occasion is included in different CSI subframe sets (that is, the subframe included in one CSI subframe set is included in different CSI-RS occasion), the coexistence method 2 may be applied. That is, the UE may generate the CSI reports for each CSI subframe set within the CSI-RS occasion. In this case, the CSI-RS resources configuring one associated CSI-RS resource may be included in the same CSI subframe set. According to the coexistence method 2, the CSI-RS configuration corresponding to the two CSI subframe sets may be determined by performing the CSI-RS occasion configuration once.

Upon the application of the coexistence method 2, the association information may be defined in the standard (coexistence method 2-1). In this case, the serving cell does not perform the additional signaling to the UE.

The UE may receive the CSI subframe set configuration and the CSI-RS occasion configurations from the serving cell. The UE may distinguish the first CSI-RS resource subset included in the first CSI subframe set and the second CSI-RS resource subset included in the second CSI subframe set, in the associated CSI-RS resource. In this case, the UE may generate the CSI report by applying an appropriate codebook depending on the configuration of each of the CSI-RS resource subsets (for example, RE mapping, CSI port count, etc.).

In the coexistence method 2-1, the UE may notice the codebook that needs to be applied to the any associated CSI-RS resource subsets. To this end, the serving cell may perform the RRC signaling on the UE or the codebook to which the UE needs to be applied may be predefined in the LTE standard. For example, when the UE does not receive the configuration of the CSI subframe set, the CSI-RS resources ID 0, ID 1, ID 2, and ID 3 may be associated depending on the CSI-RS occasion configurations. If the UE receives the configuration of the CSI subframe set, the UE may observe the CSI-RS resources ID 0 and ID 2 in the first CSI-RS subframe set and observe the CSI-RS resources ID 1 and ID 3 in the second CSI-RS subframe set. Next, the UE generates one CSI report depending on the CSI-RS resource configuration of the CSI-RS resources ID 0 and ID 2. Further, the UE generates one more CSI report depending on the CSI-RS resource configuration of the CSI-RS resources ID 1 and ID 3.

Alternatively, upon the application of the coexistence method 2, the serving cell may additionally perform the RRC signaling on the association information to the UE (coexistence method 2-1).

The UE receives both of the CSI subframe set configuration and the CSI-RS occasion configurations from the serving cell. In this case, the UE may implicitly know the CSI-RS resources included in the same CSI subframe set but the serving cell may explicitly inform the UE of any associated CSI-RS resource subset.

The coexistence method 2-1 may be functionally equivalent to the method for explicitly RRC signaling on a codebook that the UE needs to apply to the CSI report.

Figure 6:
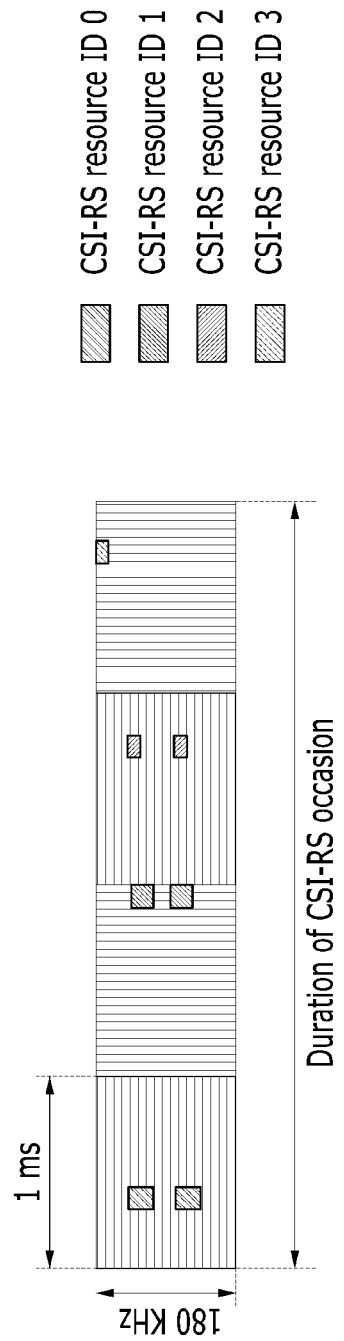
FIG. 6 is a diagram illustrating the CSI-RS occasion configured simultaneously with the CSI subframe set according to the exemplary embodiment of the present invention.

FIG. 6 is a diagram illustrating the CSI-RS occasion configured simultaneously with the CSI subframe set according to the exemplary embodiment of the present invention.

Referring to FIG. 6, when the CSI-RS occasion and the CSI subframe set are simultaneously configured in the UE, the PRB pair is illustrated. In FIG. 6, a portion represented by a horizontal stripe pattern represents the first CSI subframe set and a portion represented by a vertical stripe pattern represents the second CSI subframe set.

For example, the UE may associate the CSI-RS resources ID 0, ID 1, ID 2, and ID 3 by the CSI-RS occasion configurations. If the UE receives the CSI subframe set configuration, the CSI report generated by the UE may correspond to at least CSI-RS resources {ID 0, ID 2} and CSI-RS resources {ID 1, ID 3}. If the serving cell wants the CSI report using only the CSI-RS resource {ID 2}, the serving cell may additionally allocate the CSI-RS resource ID list to the UE or may perform the RRC signaling on the association information for separate CSI report generation to the UE. Simultaneously configuring the CSI-RS occasion and the CSI-RS subframe set in the UE according to the exemplary embodiment may be used when the serving cell configures both of the horizontal CSI report and the joint CSI report in the UE. The UE may generate the joint CSI report from the CSI-RS resources ID 0 and ID 2 and generate the horizontal CSI report from the CSI-RS resource ID 2, in the same associated CSI-RS resources depending on the association information of the serving cell.

Further, the UE may consider various combinations of CSI-RS resource associations even for the CSI-RS resources included in the same CSI subframe set, through the added association information.

Meanwhile, when the UE generates the plurality of CSI reports, a channel state information process (CSI process) may be configured. The serving cell may configure at least one CSI process in the UE depending on an interference hypothesis or a coordinated multipoint (CoMP) hypothesis.

The CSI process may be configured by a configuration of the CSI-RS and a configuration of channel state information-interference measurement (CSI-IM). The configuration of the CSI-RS is similar to the configuration of the CSI-IM and both of them have a similar IE other than the portion where the number of CSI-RS portions is configured. To consider the case in which the UE needs to receive the CSI-RS occasion from the adjacent cells, the CSI-IM resource may also be the occasion form.

When the CSI process is configured, the information transmitted to the UE by the serving cell may include the following details.

CSI Process Configuration
CSI Process ID
The CSI-RS resource list and the association information if configured for each CSI process ID
The CSI-IM resource list and the association information if configured for each CSI process ID
The associated CSI-RS resource configuration may reuse the configuration described above. When the plurality of CSI reports are generated in the CSI-RS resource list, the association information may be configured and when the one CSI report is generated, the association information may not be configured. In this case, the associated CSI-IM resource configuration may be set as the set of the CSI-IM resources.

Meanwhile, the CSI reference resource for the CSI process ID when the CSI process is configured may include both of the CSI reference resource of the CSI-RS resource association and the CSI reference resource of the CSI-IM resource association.

As the method for enhancing a CSI-RS, the plurality of CSI-RS resources for the CSI process may be configured in the UE. In this case, the IDs of the plurality of CSI-RS resources included in the same CSI process may be defined depending on the following method.

Method for Allowing a Plurality of CSI-RS Resources to have a Common NZP CSI-RS ID
Method for Allowing a Plurality of CSI-RS Resources to have Distinct NZP CSI-RS IDs In the case of the method for allowing the plurality of CSI-RS resources to have the common NZP CSI-RS ID, it may be assumed that the QCL is established between the plurality of CSI-RS resources having the common NZP CSI-RS ID. Therefore, a parameter set of PQI may include one NZP CSI-RS ID (for example, 'qcl-CSI-RS-ConfigNZPId-r11').

In the case of the method for allowing a plurality of CSI-RS resources to have distinct NZP CSI-RS IDs, it may be assumed that the QCL is always established between the plurality of CSI-RS resources having distinct NZP CSI-RS IDs within one CSI process and it may be assumed that the QCL is not basically established except for the case in which there is the separate indication from the serving cell to the UE. When the QCL is always established between the plurality of CSI-RS resources, the parameter set of the PQI may include one NZP CSI-RS ID. However, if it is assumed that the QCL is basically not established, the set (s) of the CSI-RS resources that may represent QCL relationships therebetween may be provided to the UE through the additional signaling from the serving cell. According to the exemplary embodiment of the present invention, the CSI-RS resources representing the QCL relationship with each other or the set of the IDs corresponding thereto are referred to as the QCL set.

Table 1 exemplarily shows the QCL set for the CSI-RS resources included in one CSI process.

Referring to Table 1, the QCL set for five CSI-RS resources having different NZP CSI-RS IDs within one CSI process is configured.

TABLE 1

| CSI-RS resource | ID | QCL set |
| --- | --- | --- |
| CSI-RS resource A | NZP CSI-RS ID 0 | QCL set 1 = {NZP CSI-RS |
| CSI-RS resource B | NZP CSI-RS ID 1 | ID 0, 1 , 2} |
| CSI-RS resource C | NZP CSI-RS ID 2 | |
| CSI-RS resource D | NZP CSI-RS ID 3 | QCL set 2 = {NZP CSI-RS |
| CSI-RS resource E | NZP CSI-RS ID 4 | ID 3, 4} |

In this case, for the QCL hypothesis for the PDSCH antenna port of the UE, instead of the NZP CSI-RS ID included in the parameter set of the PQI, the index of the QCL set having the QCL relationship with the PDSCH antenna port may be signaled to the UE. Alternatively, the parameter set of the PQI may include at least one NZP CSI-RS ID among the CSI-RS resources having the QCL relationship with the PDSCH antenna port In this case, the NZP CSI-RS ID may be the lowest ID in the QCL set or may be ID arbitrarily selected by the serving cell within the QCL set.

In the case of the method for allowing the plurality of CSI-RS resources to have distinct NZP CSI-RS IDs, the extension of 'qcl-CRS-Info-r11' IE may be required.

Meanwhile, the UE in which both the CSI process and the CSI subframe set are configured from the serving cell may distinguish the resources included in the CSI subframe set to ensure that the CSI-RS resources and the CSI-IM resources are in the same CSI subframe set. In this case, the CSI-RS resources and the CSI-IM resources may be configured in the UE through the CSI process. The UE may generate the CSI report based on the association information or the association assumption in the distinguished resources.

According to the exemplary embodiment, a zero-power (ZP) CSI-RS may be configured in the continued subframe. That is, the UE may assume the ZP CSI-RS in the subframe included in the CSI-RS occasion. In this case, independent ZP CSI-RS mapping may be assumed in each subframe. ZP CSI-RS may be used for rate matching of PDSCH or rate matching of EPDCCH, or may be used for configurations of CSI-IM. Thus, the ZP CSI-RS resources may not be aggregated, and the association information may not be needed.

The ZP CSI-RS occasion configurations on the ZP CSI-RS resources may include the following information.
  ZP CSI-RS occasion periodicity
  ZP CSI-RS occasion subframe offset
  ZP CSI-RS occasion duration (The ZP CSI-RS occasion duration may be omitted when the length of the ZP CSI-RS occasion subframe is one subframe.)
  ZP CSI-RS resource ID list
  ZP CSI-RS resource configuration for each ZP CSI-RS resource ID
  Relative subframe offset for each ZP CSI-RS resource ID (The relative subframe offset may be configured when the ZP CSI-RS occasion duration is configured, and may be omitted in other cases.)

According to the exemplary embodiment of the present invention, a channel state information interference measurement (CSI-IM) resource may be configured in the contiguous subframe. That is, the UE may assume the CSI-IM resource in the subframe included in the CSI-RS resources. On each subframe, independent CSI-IM resource mapping may be assumed.

The CSI-IM occasion configuration on the CSI-IM resources may include the following information.
  CSI-IM occasion periodicity
  CSI-IM occasion subframe offset
  CSI-IM occasion duration (The CSI-IM occasion duration may be omitted when the length of the CSI-IM occasion subframe is one subframe.)
  CSI-IM resource ID list
    CSI-IM resource configuration for each CSI-IM resource ID
    Relative subframe offset for each CSI-IM resource ID (The relative subframe offset may be configured when the CSI-IM occasion duration is configured, and may be omitted in other cases.)
    Association information for each CSI-IM resource ID (The association information may be configured when the CSI-IM occasion duration is configured, and may be omitted in other cases.)

The UE may derive channel quality indicator (CQI) by considering the CSI-IM resources included in the CSI-IM occasion as single composite CSI-IM resource. When the serving cell configures CSI-IM resources over a plurality of CSI-IM subframes, the serving cell may configure periodicity and subframe offset to inform the UE of the location of the CSI-IM subframe to the UE. Further, the relative subframe offset information and the association information may be configured to the UE.

According to the exemplary embodiment, when the CSI-RS occasion is configured, the rate matching may be independently applied to the PDSCH and an enhanced physical downlink control channel (EPDCCH) in each subframe included in the CSI-RS occasion and the ZP CSI-RS occasion.

According to the exemplary embodiment of the present invention, an aperiodic CSI report may also be supported. In this case, even in the case of the aperiodic CSI report, like a periodic CSI report, the plurality of CSI reports may be generated in the plurality of CSI-RS resources.

The aperiodic CSI report may be indicated by a CSI request field of 1 bit along with an uplink grant (UL grant) in DCI format 0 or format 4. The UE analyzes the CSI request field to generate the CSI report from the CSI reference resource and generates the CSI report associated with a transport block allocated by the UL grant to the UE.

When the CSI-RS is transmitted through the configured CSI-RS occasion, the UE may receive the aperiodic CSI request from the serving cell and then generate the CSI report based on the CSI derived from most recently received CSI-RS occasion.

The aperiodic CSI report may include the CSI-RS resource ID and interference/noise estimation reset signaling When the serving cell requests the aperiodic CSI report to the UE, the serving cell adds a separate 1 bit field for the CSI request field in the DCI format 0 or format 4 to indicate the interference/noise estimation reset. For example, if a CSI request bit field is 1 (CSI request bit field=1) and the interference/noise estimation reset bit field is 1 (interference/noise estimation reset bit field=1), the UE may begin to measure interference and noise from the subframe including the downlink subframe receiving the corresponding DCI format and generate the CSI report. Further, if the CSI request bit field is 1 (CSI request bit field=1) and the interference/noise estimation reset bit field is 0 (interference/noise estimation reset bit field=0), the UE may not reset measuring the interference and the noise and generate the CSI report.

Hereinafter, the CSI-RS port mapping will be described.

When the serving cell configures the plurality of CSI-RS resources in the UE, the CSI-RS port included in each CSI-RS resource may be numbered in order (for example, {15, 16, . . . }). However, the UE may reconfigure the CSI-RS port transmitted by the serving cell to accurately recognize the CSI-RS port configuration of the serving cell.

According to the exemplary embodiment of the present invention, if the codebook analyzing {1, 2, 4, 8} CSI-RS ports in a one-dimensional array is used, terminal is used, the CSI-RS port configuration of the serving cell is analyzed as the existing CSI-RS port index to perform the channel estimation. However, if eight or more CSI-RS ports are configured in the UE, the serving cell may use the plurality of CSI-RS resources to transmit the CSI-RS to the UE.

Hereinafter, the 1D CSI-RS port configuration according to the exemplary embodiment will be described.

In this case, the serving cell configures Q CSI-RS ports. The Q may be derived as $(Q_1, Q_2, Q_3, Q_4)$ depending on the following Equation 3.

$$Q=8Q_1+4Q_2+2Q_3+Q_4 \quad \text{(Equation 3)}$$

In this case, for the transmission of the Q CSI-RS ports, $Q_1$ 8-port CSI-RS resources may be used, $Q_2$ 4-port CSI-RS resources may be used, $Q_3$ 2-port CSI-RS resources may be used, and $Q_4$ 1-port CSI-RS resources may be used. For $(Q_1, Q_2, Q_3, Q_4)$ to be uniquely determined, $\{Q_2, Q_3, Q_4\} \subset \{0,1\}$ may be determined. When different CSI-RS resources that have the same number of ports are set in plural to be operated, the signaling overhead is more increased than one CSI-RS resource and the channel estimation error does not decrease.

In this case, the sequence of the CSI-RS ports in one CSI-RS resource needs to coincide with the sequence of the CSI-RS ports in the transmission of the overall CSI-RS port, such that the Rel-12 standard may be reused in each CSI-RS resources and the CSI-RS port may be allocated.

When the CSI-RS port of the serving cell consists of (M, N, P), Q=M×N×P. In the case of the 1D configuration, M=1, and therefore Q may be represented by the following Equation 4.

$$Q=N\times P=8Q_1+4Q_2+2Q_3+Q_4 \quad \text{(Equation 4)}$$

Figure 7:
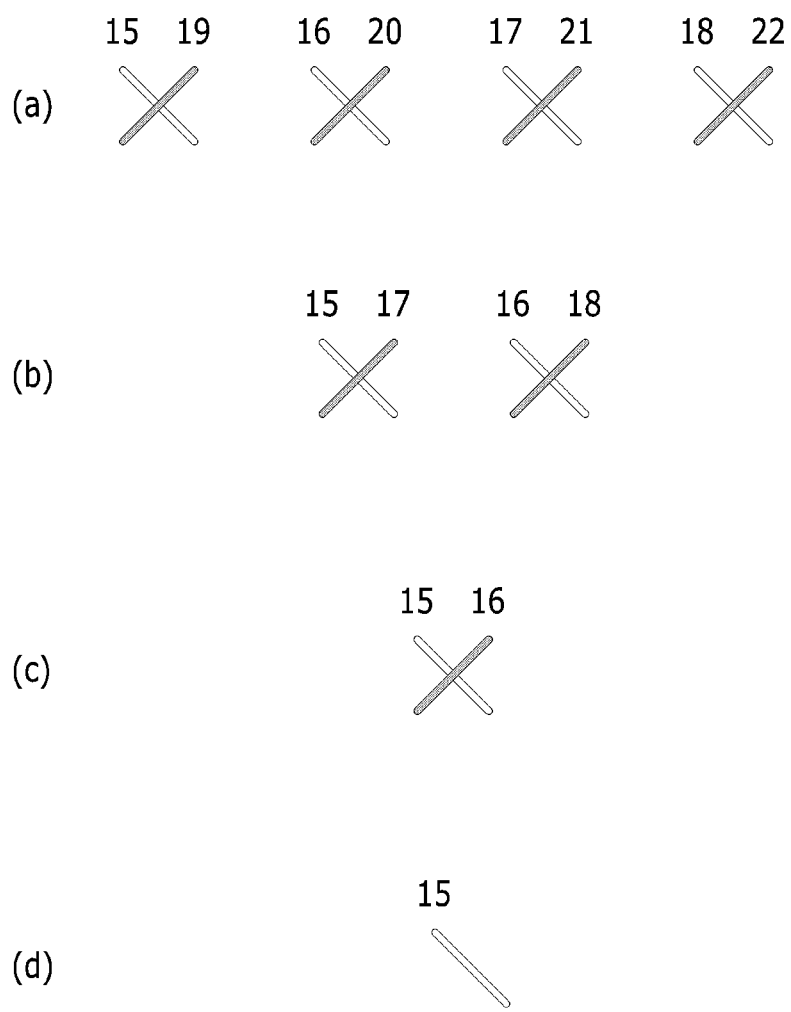
FIG. 7 is a diagram illustrating CSI-RS port indexing in CSI-RS resources according to an exemplary embodiment of the present invention.

FIG. 7 is a diagram illustrating CSI-RS port indexing in the CSI-RS resources according to an exemplary embodiment of the present invention.

Referring to FIG. 7, the CSI-RS port in one CSI-RS resource may be allocated in order of the antenna element having the same polarization characteristics.

In the above equation 4, the CSI-RS ports may correspond to the $Q_1$ 8-port CSI-RS resources, the CSI-RS ports may correspond to the $Q_2$ 4-port CSI-RS resources, the CSI-RS ports may correspond to the $Q_3$ 2-port CSI-RS resource, and the CSI-RS port may correspond to the $Q_4$ 1-port CSI-RS resources. If a cross pol configuration is applied, $Q_4$=0.

Sequentially naming the CSI-RS port, the following relationship may be established.

$q_1 \in \{1,2,\ldots,Q_1\}$-th 8-port CSI-RS resources may consist of $15+4(q_1-1)+\{0,1,2,3\}$ and $15+N+4(q_1-1)+\{0,1,2,3\}$.

$q_2$=1-th 4-port CSI-RS resources may consist of $15+4(Q_1-1)+\{0,1\}$ and $15+N+4(Q_1-1)+\{0,1\}$ $(Q_2=1)$.

$q_3$=1-th 2-port CSI-RS resources may consist of $15+4(Q_1-1)+2(Q_2-1)$ and $15+N+4(Q_1-1)+2(Q_2-1)(Q_3=1)$.

Hereinafter, the 2D CSI-RS port configuration according to another exemplary embodiment will be described.

The CSI-RS port in the 2D uniform rectangular array (URA) antenna may be allocated by the following two methods. The first method is a method for re-disposing CSI-RS ports in a line to allocate a CSI-RS port sequence to the UE when the serving cell configures a 1D PMI codebook or a 2D PMI codebook in the UE. The second method is a method for re-disposing CSI-RS ports at 2D position to allocate a CSI-RS port sequence to the UE when the serving cell configures a 1D PMI codebook or a 2D PMI codebook in the UE.

When the plurality of CSI-RS resources having the 2D CSI-RS port allocation are contiguously disposed in a line, the CSI-RS port configuration may be converted to be one 2D CSI-RS port allocation having the same principle.

For the 2D CSI-RS port disposition given as the (M, N, P), the plurality of CSI-RS resources may be used. The serving cell may inform the UE of the order of each CSI-RS resources and the disposition information (M or N value) of the 2D CSI-RS port. In this case, the serving cell may inform the UE of relative positions of the CSI-RS resources. For example, the serving cell may inform the UE of the 2D disposition information on how many CSI-RS resources are positioned from a horizontal axis and are positioned from a horizontal axis. The UE logically re-disposes the CSI-RS resources in 2D and then may perform the CSI-RS port numbering by a CSI-RS numbering method designated by the serving cell.

Figure 8:
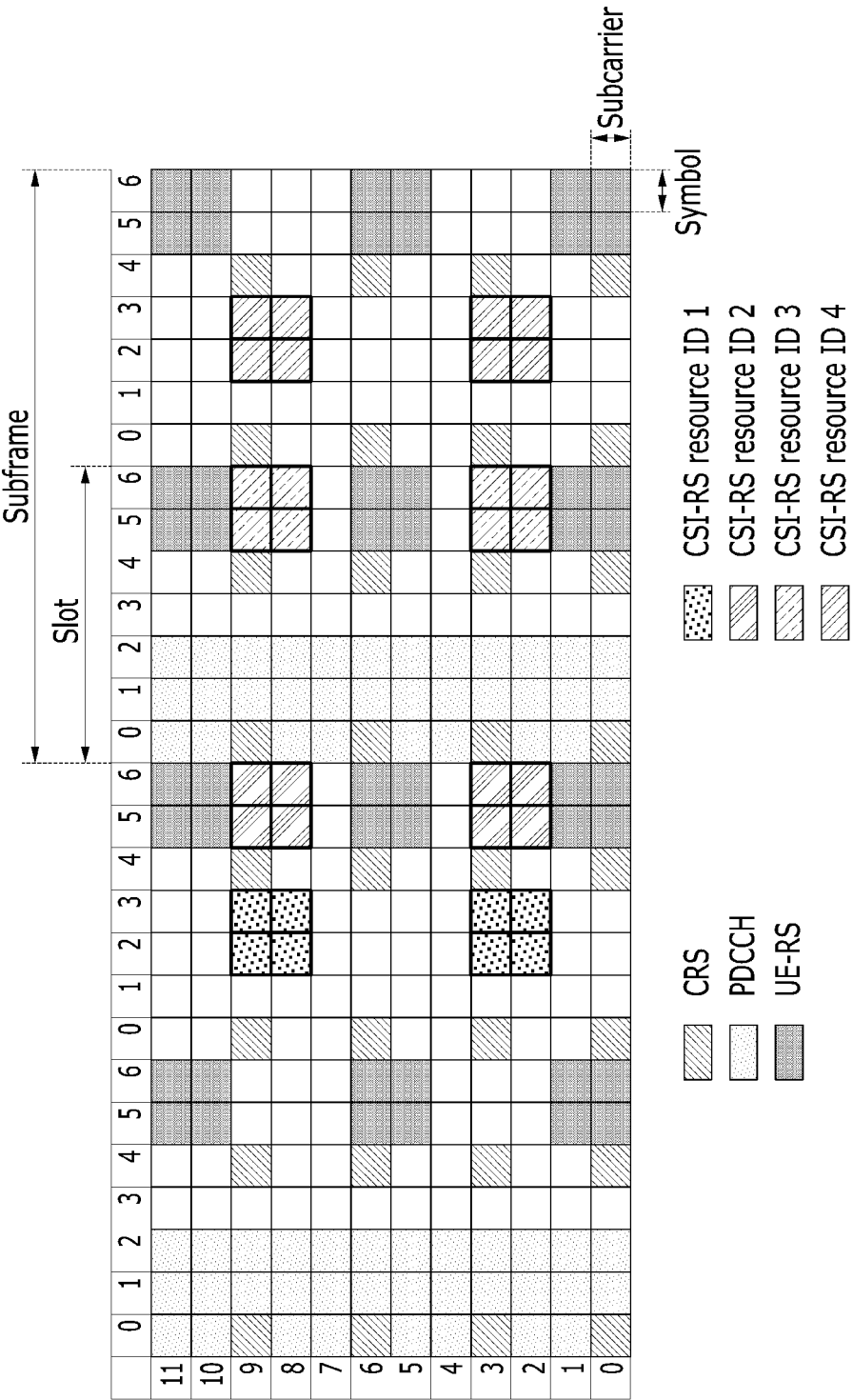
FIG. 8 is a diagram illustrating CSI-RS resources defined in a multi subframe according to an exemplary embodiment of the present invention.

FIG. 8 is a diagram illustrating the CSI-RS resources defined in a multi subframe set according to an exemplary embodiment of the present invention.

Referring to FIG. 8, the serving cell may define four CSI-RS resource IDs and the CSI-RS may be transmitted in the two subframes. In this case, the CSI-RS occasion of the serving cell may be defined as illustrated in FIG. 8. Referring to FIG. 8, the serving cell transmits the CSI-RS resources ID 1, ID 2, ID 3, and ID 4. If it is assumed that the UE observes the CSI-RS resources ID1 and ID4, the information transmitted to the UE by the serving cell may include the following information.

CSI-RS occasion configurations:
Periodicity
Duration: 2 ms
Subframe offset of first CSI-RS subframe
CSI-RS resource list: CSI-RS port resource list: ID A, ID B
  CSI-RS resource ID: A (corresponding to ID 1)
  The number of CSI-RS ports: 8
  CSI-RS resource configuration index: 2
  CSI-RS resource ID: B (corresponding to ID 4)
  The number of CSI-RS ports: 8
  CSI-RS resource configuration index: 2
  Relative CSI-RS substrate offset for CSI-RS resource ID 1: 1

In this case, the UE may generate the CSI report for the CSI-RS resources ID 1 and ID 4. The UE may consider that the CSI-RS ports {15, 16, . . . , 22} and the CSI-RS resource configuration index 2 are used for the CSI-RS resource ID 1 and the CSI-RS ports {15, 16, . . . , 22} and the CSI-RS resource configuration index 2 are used for the CSI-RS resource ID 4.

The UE may generate the CSI report based on the codebook, depending on the estimated CSI. Further, the UE may derive the noise and the interference using all the subframes included in the CSI-RS occasion.

Figure 9:
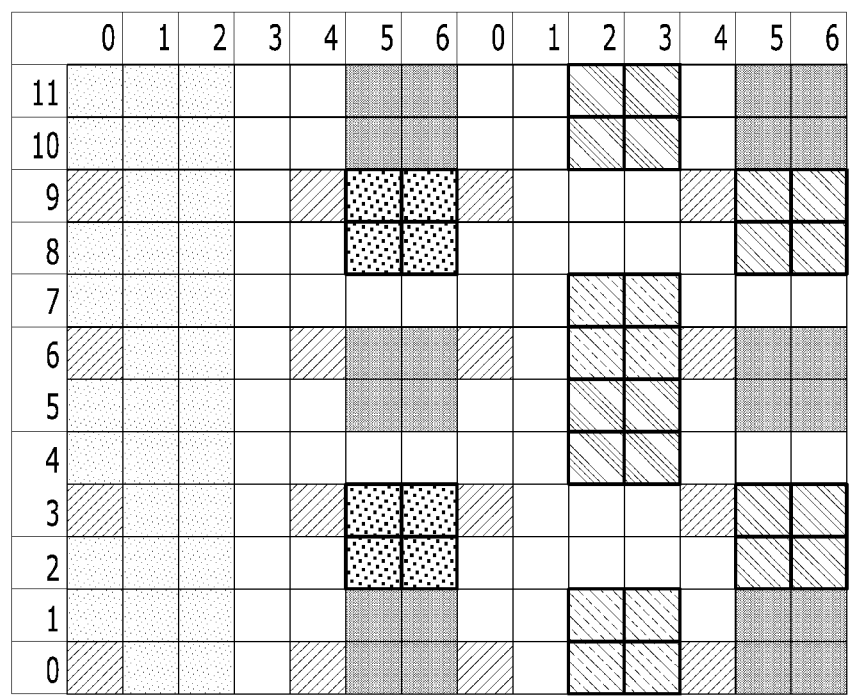
FIG. 9 is a diagram illustrating the CSI-RS resources defined in one subframe frame according to an exemplary embodiment of the present invention.

FIG. 9 is a diagram illustrating the CSI-RS resources defined in one subframe according to an exemplary embodiment of the present invention.

Referring to FIG. 9, the serving cell may define four CSI-RS resource IDs and the CSI-RS may be transmitted in the one subframe. In this case, the CSI-RS occasion of the serving cell may be defined as illustrated in FIG. 9. In this case, the information transmitted to the UE by the serving cell may include the following information.

CSI-RS occasion configuration:
Periodicity
Subframe offset of first CSI-RS subframe
CSI-RS resource list: ID 1, ID 2, ID 3, ID 4
CSI-RS resource ID: 1
The number of CSI-RS ports: 8
CSI-RS resource configuration index: 0
CSI-RS resource ID: 2
The number of CSI-RS ports: 8
CSI-RS resource configuration index: 1
CSI-RS resource ID: 3
The number of CSI-RS ports: 8
CSI-RS resource configuration index: 3
CSI-RS resource ID: 4
The number of CSI-RS port: 8
CSI-RS resource configuration index: 4

The UE may generate the CSI reports for the CSI-RS resources ID 1 & ID 2 & ID 3 & ID 4. Referring to FIG. 9, the UE may consider that the CSI-RS ports {15, 16, ..., 22} and the CSI-RS resource configuration index 0 are used for the CSI-RS resource ID 1. Alternatively, the UE may consider that the CSI-RS ports {15, 16, ..., 22} and the CSI-RS resource configuration index 1 are used for the CSI-RS resource ID 1. The UE may consider that the CSI-RS ports {15, 16, ..., 22} and the CSI-RS resource configuration index 3 are used for the CSI-RS resource ID 2. The UE may consider that the CSI-RS ports {15, 16, ..., 22} and the CSI-RS resource configuration index 4 are used for the CSI-RS resource ID 3. The UE may generate the CSI report based on the codebook, depending on the estimated CSI.

In this case, the UE may use a union of the CSI reference resources applied to the CSI-RS resources ID 1 & 2 & 3 & 4 for the CSI report generation.

Figure 10:
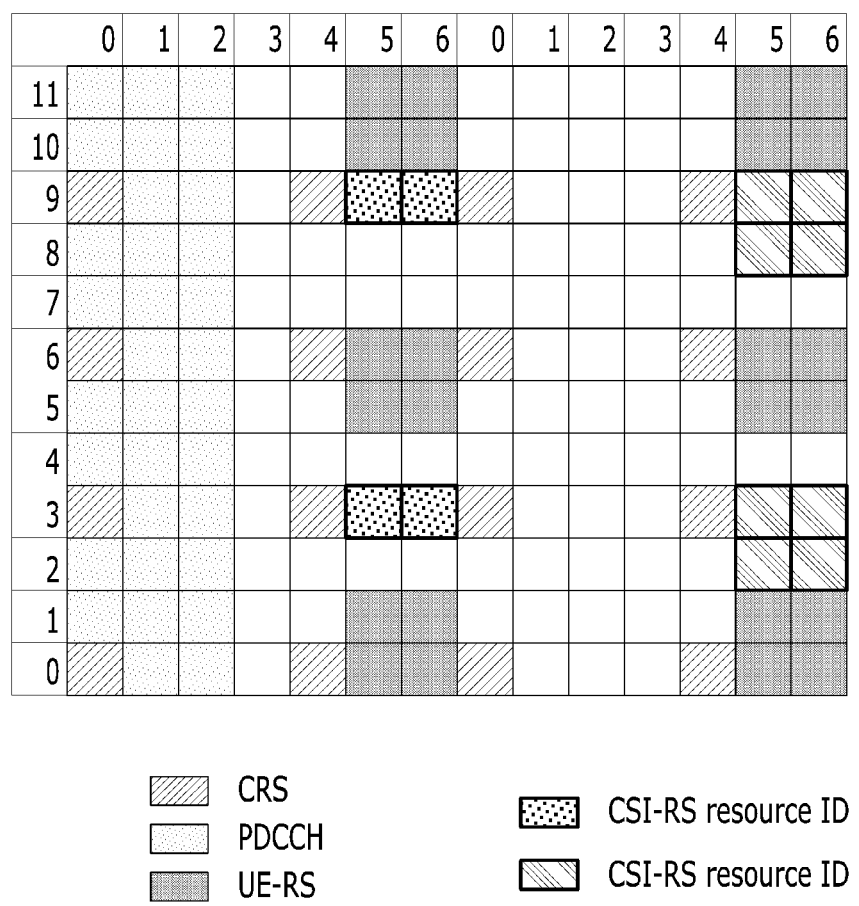
FIG. 10 is a diagram illustrating CSI-RS resources defined in one subframe set according to another exemplary embodiment of the present invention.

FIG. 10 is a diagram illustrating the CSI-RS resources defined in one subframe set according to another exemplary embodiment of the present invention.

According to the exemplary embodiment of the present invention, the serving cell may separately receive the CSI reports for the horizontal CSI and the vertical CSI. Referring to FIG. 10, the serving cell may define two CSI-RS resource IDs and the CSI-RS may be transmitted in the one subframe. In this case, the information transmitted to the UE by the serving cell may be the information on the CSI-RS resource ID 1 and the CSI-RS resource ID 2.

CSI-RS Occasion Configuration:
Periodicity
Duration 1 ms (omissible)
Subframe offset of first CSI-RS subframe
CSI-RS resource list: ID 1, ID 2
CSI-RS resource ID: 1
The number of CSI-RS ports: 4
CSI-RS resource configuration index: 0
CSI-RS resource ID: 2
The number of CSI-RS ports: 8
CSI-RS resource configuration index: 4
Relative CSI-RS subframe offset: 0 (omissible)

The UE may generate the CSI report for the CSI-RS resource ID 1. In this case, the UE may consider that the serving cell uses the CSI-RS ports {15, 16, 17, 18} and the CSI-RS resource configuration index 0 to transmit the CSI-RS. Further, the UE generates the CSI reports depending on a 4-Tx codebook.

The UE may generate the CSI report for the CSI-RS resource ID 2. The UE may consider that the serving cell uses the CSI-RS ports {15, 16, ..., 22} and the CSI-RS resource configuration index 4 to transmit the CSI-RS. Further, the UE generates the CSI reports depending on a 8-Tx codebook.

Figure 11:
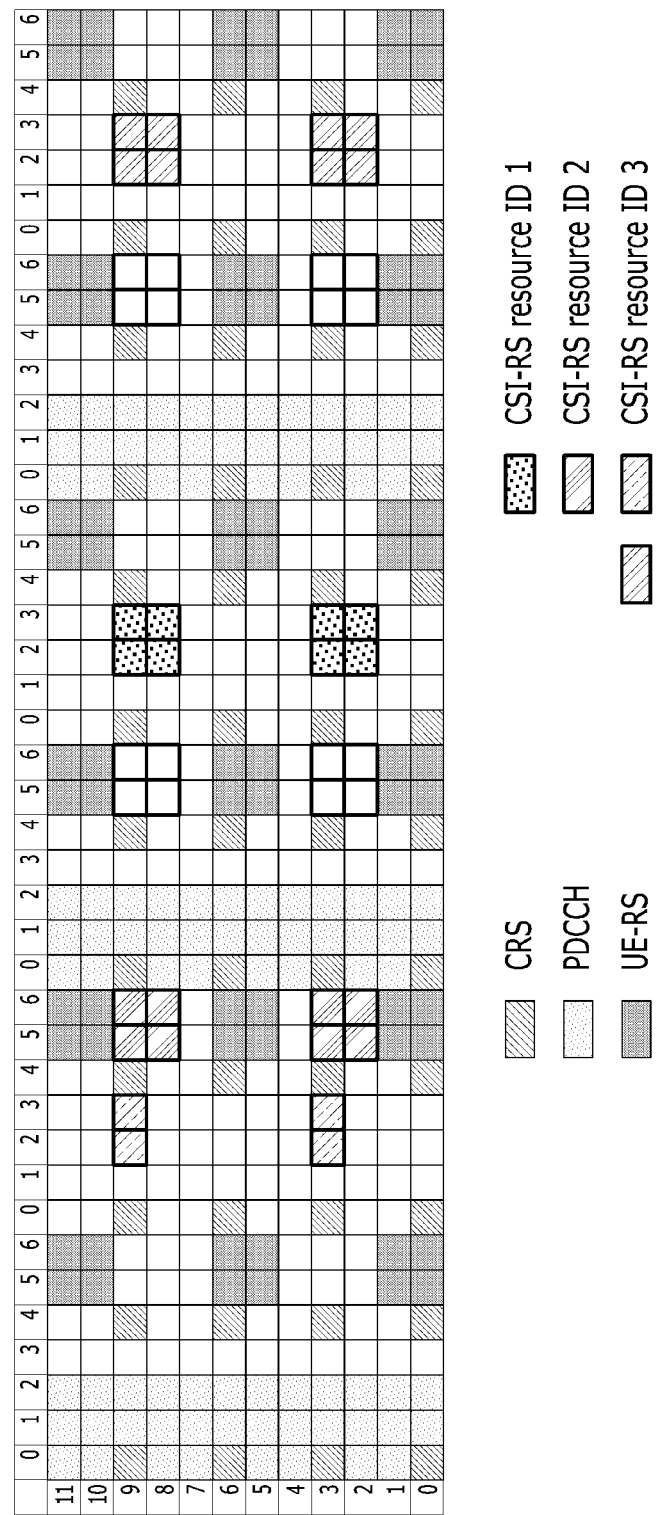
FIG. 11 is a diagram illustrating CSI-RS resources defined in a multi subframe set according to another exemplary embodiment of the present invention.

FIG. 11 is a diagram illustrating CSI-RS resources defined in a multi subframe set according to another exemplary embodiment of the present invention.

According to another exemplary embodiment of the present invention, the UE may perform the CSI report on the CSI-RS transmitted from the adjacent cells as well as the CSI reports of the serving cell. In this case, at least one CSI process may be defined. In this case, the serving cell may transmit the following information to the UE for the CSI process.

CSI-RS Occasion Configuration:
Periodicity
Duration
First subframe offset
CSI process list: ID 1, ID 2, ID 3
CSI Process ID: 1
Subframe offset of first CSI-RS subframe included in CSI-RS occasion 1
CSI-RS resource list: ID 1
CSI-RS resource ID: 1
The number of CSI-RS ports: 8
CSI-RS resource configuration index: 2
CSI process ID: 2
Subframe offset of first CSI-RS subframe included in CSI-RS occasion 0
CSI-RS resource list: ID 1
CSI-RS resource ID: 1
The number of CSI-RS ports: 8
CSI-RS resource configuration index: 2
CSI process ID: 3
Subframe offset of first CSI-RS subframe included in CSI-RS occasion 0
CSI-RS resource list: ID 1, ID 2
CSI-RS resource ID: 1
The number of CSI-RS ports: 4
CSI-RS resource configuration index: 2
CSI-RS resource ID: 2
The number of CSI-RS ports: 8
CSI-RS resource configuration index: 2
Relative CSI-RS subframe offset for CSI-RS port subset ID 1: 2

According to another exemplary embodiment, the UE may generate the separate CSI report for each CSI process. The UE may have the common CSI reference resource assumption so that all of the CSI processes commonly have the noise and the interference. To this end, the duration of the CSI-RS occasion and the subframe offset of the CSI-RS occasion are set to be identical and the CSI-RS may be transmitted in the same CSI-RS occasion. In this case, the UE measures the noise and the interference in the union of the subframes included in each CSI process. Referring to FIG. 11, the UE may analyze three subframes as the CSI reference resource.

In the CSI process ID 1, one CSI report may be generated. The UE generates the CSI reports based on the CSI-RS ports {15, 16, . . . , 22} and an 8-Tx codebook.

In the CSI process ID 2, one CSI report may be generated. The UE generates the CSI reports based on the CSI-RS ports {15, 16, . . . , 22} and an 8-Tx codebook.

In the CSI process ID 3, one CSI report may be generated through the CSI-RS resource ID 1 and ID 2 based on the association information. The UE may consider that the serving cell uses the CSI-RS ports {15, 16, 17, 18} in the CSI-RS resource ID1 to transmit the CSI-RS. The CSI-RS resource ID 2 may be transmitted after two subframes from the CSI-RS resource ID 1 by using the CSI-RS ports {15, 16, . . . , 22}. The UE generates the CSI reports based on a 12-Tx codebook, depending on the estimated CSI.

FIGS. 12A to 12D is a diagram illustrating the CSI-RS port numbering of the serving cell according to another exemplary embodiment of the present invention.

According to another exemplary of the present invention, the serving cell may transmit the CSI-RS port in which the (M, N, P) is 4, 2, and 2 to the two 8-port CSI-RS resources. According to another exemplary embodiment illustrated in FIGS. 12A to 12D, the serving cell configures a 2D PMI codebook (2, 2, 2) in the UE. The serving cell may transmit the CSI-RS port as illustrated in FIG. 12A.

Referring to FIG. 12B, the UE receives the first CSI-RS resource and the second CSI-RS resource and receives M=4 from the serving cell. The UE knows M in a total of 16 CSI-RS ports and therefore may know N=2 (N=16/M/P=2). Therefore, the UE may determine whether the received CSI-RS resources are horizontally arranged in a line or whether the received CSI-RS resources are vertically arranged in a line.

Referring to FIG. 12C, since M=4 and N=2, the UE may contiguously vertically dispose the first CSI-RS resource and the second CSI-RS resource. The UE uses the numbered rules in the serving cell as they are to first store the horizontal port and then designate the polarization and dispose the subsequent. Referring to FIG. 12D, the UE applies the process to all of the rows to complete the numbering of all of the CSI-RS ports.

FIGS. 13A to 13D are diagrams illustrating CSI-RS port numbering of a serving cell according to another exemplary embodiment of the present invention.

Figures 13A, 13B, 13C, 13D:
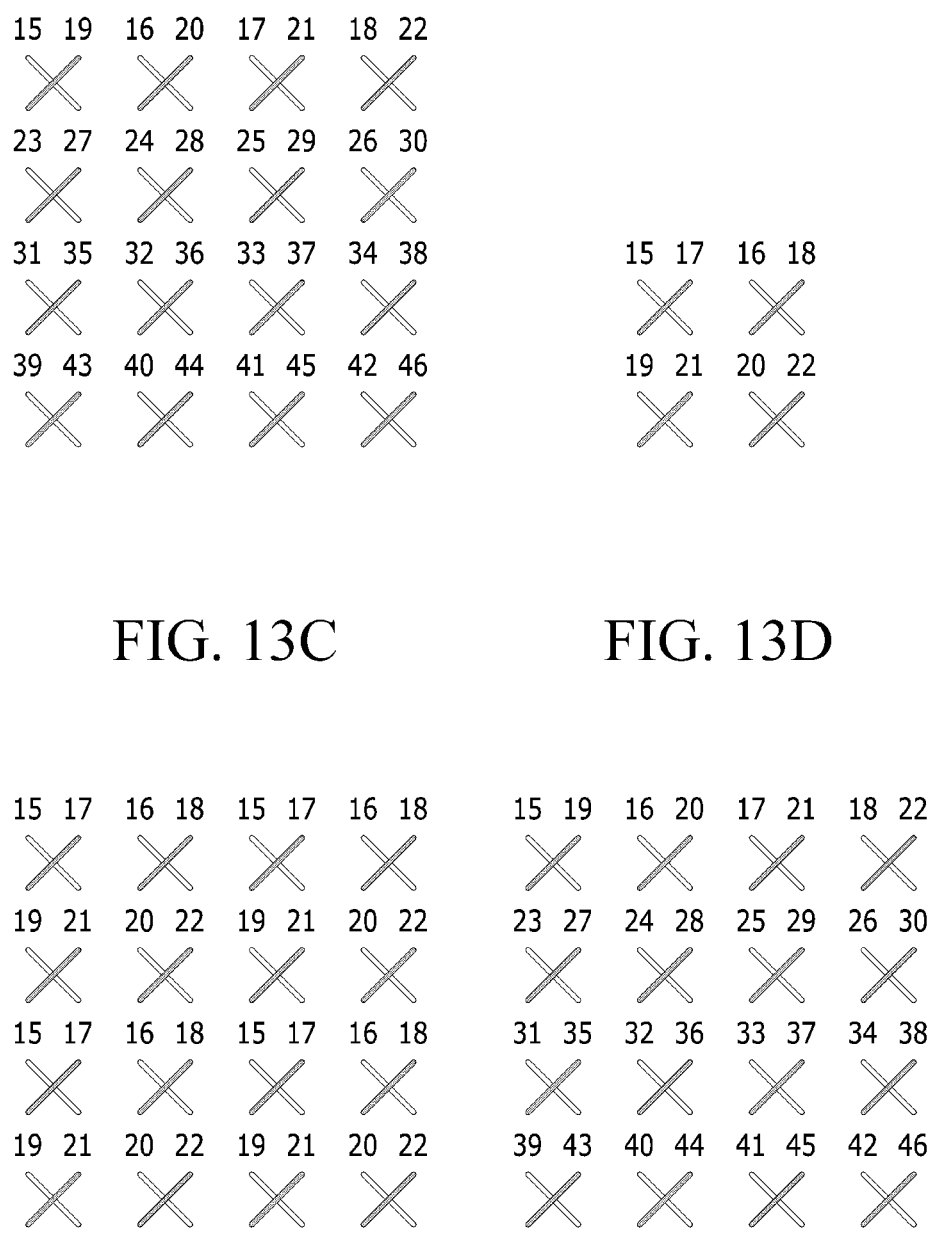

Referring to FIG. 13A, the serving cell may transmit the CSI-RS port in which the (M, N, P) is (4, 4, 2) to the four 4-port CSI-RS resources. The serving cell configures the 2D PMI codebook (2, 2, 2) to the UE and informs the UE of the method for positioning each CSI-RS resource.

Referring to FIG. 13B, the UE may recognize a first CSI-RS resource corresponding to a 1×1 position, a second CSI-RS resource corresponding to a 1×2 position, a third CSI-RS resource corresponding to a 2×1 position, and a fourth CSI-RS resource corresponding to a 2×2 position through the information provided by the serving cell. Referring to FIG. 13C, the UE collects the position of the CSI-RS resource to estimate the port numbering of the CSI-RS port transmitted by the serving cell. Next, referring to FIG. 13D, the UE uses the rules numbered in the serving cell as they are to first store the horizontal port and then designate the polarization and dispose the subsequent row. Consequently, the UE applies the above-mentioned processes to all of the rows to complete the numbering of all of the CSI-RS ports.

As described above, according to the exemplary embodiment of the present invention, the CSI report for a larger number of antenna ports may be generated using the CSI-RS occasion including at least one subframe.

Figure 14:
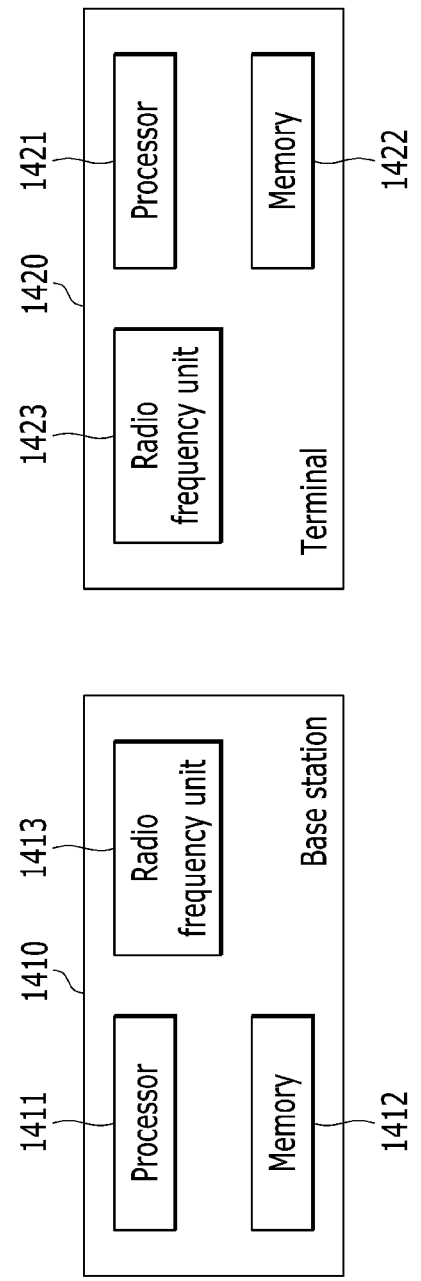
FIG. 14 is a block diagram illustrating a wireless communication system according to an exemplary embodiment of the present invention.

FIG. 14 is a block diagram illustrating a wireless communication system according to an exemplary embodiment of the present invention.

Referring to FIG. 14, a wireless communication system according to an exemplary embodiment includes a base station 1410 and a terminal 1420. The base station 1410 includes a processor 1411, a memory 1412, and a radio frequency unit (RF unit) 1413. The memory 1412 is connected to the processor 1411 to store various information for driving the processor 1411 or at least one program executed by the processor 1411. The wireless frequency unit 1413 may be connected to the processor 1411 to transmit/receive a wireless signal. The processor 1411 may implement functions, processes, or methods proposed by the exemplary embodiment of the present disclosure. In this case, in the wireless communication system according to the exemplary embodiment of the present invention, a wireless interface protocol layer may be implemented by the processor 1411. An operation of the base station 1410 according to the exemplary embodiment may be implemented by the processor 1411.

The terminal 1420 includes a processor 1421, a memory 1422, and a radio frequency unit 1423. The memory 1422 may be connected to the processor 1421 to store various information for driving the processor 1421.

The radio frequency unit 1423 may be connected to the processor 1421 to transmit/receive a wireless signal. The processor 1421 may implement functions, processes, or methods proposed by the exemplary embodiment of the present disclosure. In this case, in the wireless communication system according to the exemplary embodiment of the present invention, a wireless interface protocol layer may be implemented by the processor 1421. An operation of the terminal 1420 according to the exemplary embodiment may be implemented by the processor 1421.

According to the exemplary embodiment of the present invention, the memory may be positioned inside or outside the processor and the memory may be connected to the processor through already known various means. The memory is various types of volatile or non-volatile storage media. For example, the memory may include a read-only memory (ROM) or a random access memory (RAM).

Although the exemplary embodiments are described in detail, the scope is not limited thereto but various variations or alternations by those skilled in the art using a basic concept defined in the following claims are considered to be included in the scope of the present invention.

What is claimed is:

1. A method for generating a channel state information (CSI) report of a terminal, comprising:
receiving at least two channel state information-reference signal (CSI-RS) resources from a serving cell of a base station based on a CSI-RS occasion which includes at least two subframes, wherein a first CSI-RS resource of the at least two CSI-RS resources is received in a first subframe of the CSI-RS occasion, a second CSI-RS resource of the at least two CSI-RS resources is received in a second subframe of the CSI-RS occasion, and each of the at least two subframes has a different subframe offset for the CSI-RS occasion, respectively;

generating a CSI report corresponding to a CSI reference resource by assuming the first CSI-RS resource and the second CSI-RS resource as the CSI reference resource; and transmitting the CSI report to the base station, wherein the first CSI-RS resource corresponds to a non-zero power (NZP) CSI-RS resource and the second CSI-RS resource corresponds to a channel state information-interference measurement (CSI-IM) resource.

2. The method of claim 1, further comprising: prior to the receiving, receiving configuration information on the CSI-RS occasion from the base station.

3. The method of claim 2, wherein: the receiving of the configuration information on the CSI-RS occasion from the base station includes receiving configuration information on the CSI-RS occasion from the base station through radio resource control (RRC) signaling.

4. The method of claim 2, wherein: the configuration information on the CSI-RS occasion includes at least one of period information of the CSI-RS occasion, subframe offset information of each of the at least two subframs included in the CSI-RS occasion, or identification list information of the CSI-RS resource.

5. The method of claim 4, wherein: identification list information of the CSI-RS resources includes at least one of information on the number of antenna ports for each CSI-RS resource included in the at least one CSI-RS resource, information on configuration of the at least one CSI-RS resource, or association information of the at least one CSI-RS resource.

6. The method of claim 2, wherein the configuration information of the CSI-RS occasion includes at least one of period information of the CSI-RS occasion, subframe offset information of each of the at least two subframes included in the CSI-RS occasion, duration information of the CSI-RS occasion, or identification list information of the NZP CSI-RS resource.

7. The method of claim 6, wherein the configuration information of the CSI RS occasion further includes identification list information of the CSI-IM resource.

8. A terminal, comprising:
at least one processor; a memory; and a radio frequency (RF) unit, wherein the at least one processor executes at least one program stored in the memory to perform:
receiving, through the RF unit, at least two channel state information-reference signal (CSI-RS) resources from a serving cell of a base station based on a CSI-RS occasion which includes at least two subframes, wherein a first CSI-RS resource of the at least two CSI-RS resources is received in a first subframe of the CSI-RS occasion, a second CSI-RS resource of the at least two CSI-RS resources is received in a second subframe of the CSI ossation, and each of the at least two subframes has a different subframe offset for the CSI-RS occstion;
generating a CSI report corresponding to a CSI reference resource by assuming the first CSI-RS resource and the second CSI-RS resource as the CSI reference resource; and
transmitting, through the RF unit, the CSI report to the base station, wherein the first CSI-RS resource corresponds to a non-zero power (NZP) CSI-RS resource and the second CSI-RS resource corresponds to a channel state information-interference measurement (CSI-IM) resource.

9. The terminal of claim 8, wherein: the at least one processor further executes receiving, through the RF unit, configuration information on the CSI-RS occasion from the base station, prior to the receiving of the CSI-RS by executing the at least one program.

10. The terminal of claim 9, wherein: the at least one processor executes the receiving of the configuration information on the CSI-RS occasion from the base station through radio resource control (RRC) signaling when executing the receiving of the configuration information on the CSI-RS occasion from the base station by executing the at least one program.

11. The terminal of claim 9, wherein: the configuration information on the CSI-RS occasion includes at least one of period information of the CSI-RS occasion, subframe offset information each of the at least two subframes included in of the CSI-RS occasion, or identification list information of the CSI-RS resource.

12. The terminal of claim 11, wherein: identification list information of the CSI-RS resources includes at least one of information on the number of antenna ports for each CSI-RS resource included in the at least one CSI-RS resource, information on configuration of the at least one CSI-RS resource, or association information of the at least one CSI-RS resource.

13. The terminal of claim 2, wherein the configuration information of the CSI-RS occasion includes at least one of period information of the CSI-RS occasion, subframe offset information of the CSI-RS occasion, duration information of the CSI-RS occasion, or identification list information of the NZP CSI-RS resource.

14. The terminal of claim 6, wherein the configuration information of the CSI RS occasion further includes identification list information of the CSI-IM resource.

15. A method for generating a channel state information (CSI) report of a terminal, comprising:
receiving at least two channel state information-reference signal (CSI-RS) resources from a serving cell of a base station based on a CSI-RS occasion which includes at least two subframes, wherein a first CSI-RS resource of the at least two CSI-RS resources is received in a first subframe of the CSI-RS occasion, a second CSI-RS resource of the at least two CSI-RS resources is received in a second subframe of the CSI-RS occasion, and each of the at least two subframes has a different subframe offset for the CSI-RS occasion, respectively;
generating a CSI report corresponding to a CSI reference resource by assuming the first CSI-RS resource and the second CSI-RS resource as the CSI reference resource; and
transmitting the CSI report to the base station,
wherein the first CSI-RS resource corresponds to a non-zero power (NZP) CSI-RS resource and the second CSI-RS resource corresponds to a zero-power (ZP) CSI-RS resource.

* * * * *